United States Patent [19]
Hayashi

[11] Patent Number: 5,193,441
[45] Date of Patent: Mar. 16, 1993

[54] ELECTRICALLY DRIVEN STIRRER FOR COMMERCIAL COOKING POTS

[76] Inventor: Bruce T. Hayashi, 13906 E. Walnut St., Whittier, Calif. 90602

[21] Appl. No.: 846,871

[22] Filed: Mar. 6, 1992

[51] Int. Cl.$^5$ .......................... A47J 27/00; B01F 7/18
[52] U.S. Cl. ........................................ 99/348; 366/251
[58] Field of Search ................ 99/348; 366/142, 244, 366/245, 246, 247, 248, 249, 250, 251

[56] References Cited
U.S. PATENT DOCUMENTS

| | | | |
|---|---|---|---|
| 2,700,534 | 1/1955 | Pegues | 366/251 |
| 4,151,792 | 5/1979 | Nearhood | 99/348 |
| 4,492,713 | 1/1985 | Chauvin | 99/348 |

Primary Examiner—Robert W. Jenkins
Attorney, Agent, or Firm—Edgar W. Averill, Jr.

[57] ABSTRACT

An improved electrically driven stirrer assembly affixed to a commercial cooking pot supported in a portable manner on a cooking range. The stirrer assembly has a stirrer motor affixed to the cover of the pot. The stirrer motor has a separate stirrer motor speed controlled positioned at least twelve inches away from the sides of the cooking pot so that the controller will not be damaged by the heat under the cooking pot. The assembly is particularly useful for restaurant or institutional cooking operations.

10 Claims, 1 Drawing Sheet

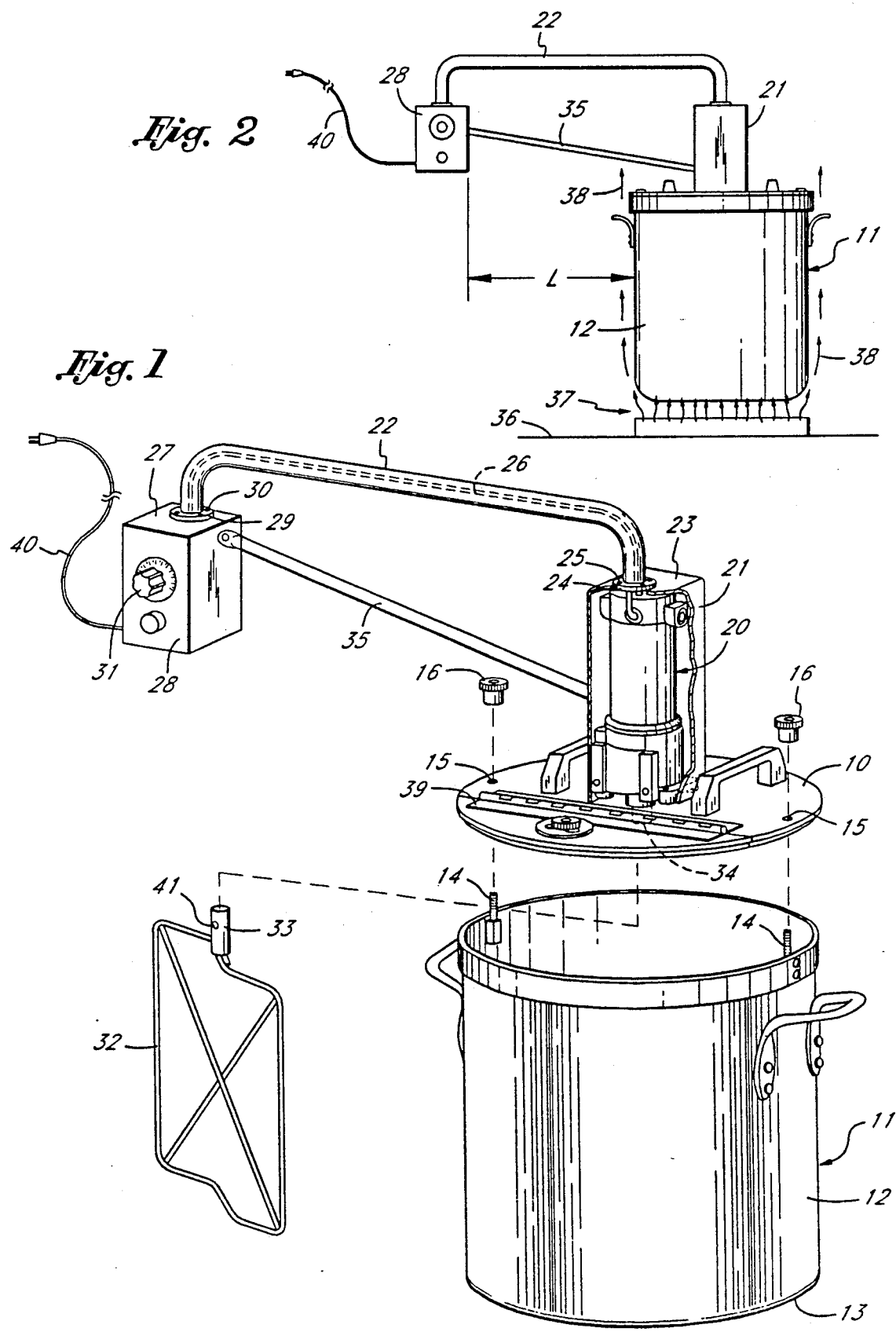

ELECTRICALLY DRIVEN STIRRER FOR COMMERCIAL COOKING POTS

BACKGROUND OF THE INVENTION

The field of the invention is cooking appliances, and the invention relates more particularly to commercial cooking pots of the type used in restaurants and institutions.

In many commercial cooking operations, it is necessary to cook a product which is relatively thick such as a sauce or a pudding which requires stirring. Many such products, if not stirred, can burn and, furthermore, many products are improved by continual stirring. Because of the hectic nature of many commercial kitchens, a cook is often distracted and unable to stir a product with sufficient frequency.

Various attempts have been made to provide means for automating the stirring operation. Once such attempt is shown in the Cuschera U.S. Pat. No. 4,856,910 which supports a motor outwardly from the pot and drives the stirrer through a long drive shaft. Another approach is shown in the Chauvin U.S. Pat. No. 4,576,089 which shows a cooking pot with a motor on the top thereof and a controller box 13 also supported above the cover. An electrical cord 19 passes over the edge of the pot. Obviously, this design would be impractical for use on gas stoves since the electrical line 19 would be easily damaged by the heat which passes upwardly along the sides of a pot when heated on a gas stove or even on an electrical stove. Furthermore, the harsh conditions of heat and humidity above the cooking pot are very harmful to the motor control circuitry, and such approach is not practical for most commercial cooking operations. Lastly, various dedicated food processing operations utilize steam-jacketed kettles which, of course, can be insulated so that electrical controllers are not damaged.

However, for the restaurant or institutional kitchen such cooking utensils are not useful since the kitchen must provide a variety of foods which utilize different cooking utensils, and dedicated processing units are too expensive or bulky for such use.

SUMMARY OF THE INVENTION

It is an object of the present invention to provide an electrically stirred cooking pot which is useful on top of a cooking range.

The present invention is for an improved electrically driven stirrer assembly affixed to a commercial cooking pot supported in a portable manner on a cooking range. The cooking pot has a pot portion which includes a bottom and cylindrical sides and a cover. The cover supports a centrally located, electrically driven stirrer motor which, in turn, supports a stirrer shaft and paddle means. A stirrer motor speed controller is supported by a hollow shaft which, in turn, is supported by the pot cover, and the stirrer motor speed controller is electrically connected to the electrically driven stirrer motor by electrical conductors passing through the hollow shaft. The stirrer motor speed controller is contained in box position at least about twelve inches away from the side of the cooking pot whereby the controller is maintained away from the source of heat for the cooking pot. Preferably, the hollow shaft is flanged at each end and affixed to covers for the stirrer motor and the controller circuitry.

BRIEF DESCRIPTION OF THE DRAWINGS

FIG. 1 is an exploded, perspective view of the improved electrically driven stirrer assembly affixed to a cooking pot.

FIG. 2 is a side view showing the apparatus of FIG. 1 supported on a cooking range.

DESCRIPTION OF THE PREFERRED EMBODIMENTS

The improved electrically driven stirrer assembly is shown in exploded, perspective view in FIG. 1. The device is supported on a cover 10 which may be secured to a commercial cooking pot 11 which has cylindrical sides 12 and a bottom 13. Cover 10 may be affixed to cooking pot 11 by a pair of bolts 14 which pass through holes 15 in cover 10 and are secured by nuts 16 to hold the cover in place.

Cover 10 also supports an electrically driven stirrer motor 20 which is secured directly to cover 10 by a series of fasteners not shown. Motor 20 is surrounded by a motor cover 21, and a hollow shaft 22 is securely affixed to the top 23 of motor cover 21 by a flange 24 and appropriate fasteners 25. Hollow shaft 22 has several electrical conductors 26 passing therethrough to a stirrer motor speed controller 27 which, in turn, is housed in a controller cover 28. Flange 29 is secured to the top of controller cover 28 by fasteners 30. Speed controller 27 has a dial 31 which controls the setting of the speed controller which, of course in turn, controls the speed of electrically driven stirrer motor 20.

Preferably, stirrer motor 20 is a direct current gear motor which provides sufficient torque to turn paddle member 32. Paddle member 32 is affixed through its stirrer driven shaft 33 to a stirrer drive shaft 34 affixed to stirrer motor 20. An elongated slot 41 is formed in shaft 33. A circular pin (not shown) passes through a hole in drive shaft 34 and through the elongated slot 41. This permits the paddle member 32 to ride up or down slightly to accommodate for slightly different dimensioned pots. The particular design of paddle member 32 depends upon the nature of the food product being prepared.

Stirrer motor speed controller 27 is further supported at a position apart from the electrically driven stirrer motor 20 by a support arm 35 which is affixed at one end to motor cover 21 and at the other end to controller cover 28.

As shown in FIG. 2, the stirrer motor speed controller 27 is supported a distance "L" from the sides 12 of commercial cooking pot 11. Distance "L" should be at least about twelve inches. The cooking range 36 is depicted as a gas range having a gas flame 37 which causes heat to rise in the direction of arrows 38 upwardly along the outer edges of sides 12. It has been found that the temperature beyond twelve inches from the edge of sides 12 is relatively cool and is not sufficiently high to damage the electrical components of speed controller 27.

Cover 10 can be readily removed for cleaning and also includes a hinged portion 39 which is lifted for adding ingredients or removing cooked food for use.

By use of the improved electrically driven stirrer assembly of the present invention, foods may be prepared with reduced labor and improved quality. The electrical cord 40 is retained in a manner that provides no safety hazard, and the controller is easily reached to manipulate dial 31 in a relatively cool position for operator comfort.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved electrically driven stirrer assembly affixed to a commercial cooking pot supported in a portable manner on a cooking range, said cooking pot having a pot portion including a bottom and cylindrical sides, and a cover, said cover supporting a centrally located, electrically driven stirrer motor which, in turn, supports a stirrer shaft and paddle means wherein said improvement comprises:

a stirrer motor speed controller supported by a hollow shaft which is supported by said cover, said stirrer motor speed controller being electrically connected to the electrically driven stirrer motor by electrical conductors passing through the hollow shaft, said stirrer motor speed controller being contained in a box positioned at least about twelve inches away from the sides of said cooking pot whereby the controller is maintained away from the source of heat for said cooking pot.

2. The improved electrical stirrer assembly of claim 1 wherein said electrically driven stirrer motor is protected by a motor cover, and said hollow shaft is in turn supported by said cover.

3. The improved electrical stirrer assembly of claim 2 wherein said hollow shaft has a flange at each end.

4. The improved electrical stirrer assembly of claim 2 wherein a second support shaft is affixed between said motor cover and the box of said stirrer motor speed controller.

5. The improved electrical stirrer assembly of claim 1 wherein said cover includes means for securing the cover to the pot.

6. An electrically stirred cooking pot removably placable on a cooking range comprising:

a pot having a bottom, generally cylindrical sides and a removable cover;

a stirrer motor affixed to the cover at the center thereof;

a stirrer drive shaft affixed to said stirrer motor;

a stirrer affixed to said stirrer drive shaft;

a hollow shaft supported in a rigid manner with respect to said motor, said hollow shaft having an inner end affixed to said motor and an outer end extending at least about twelve inches away from the sides of said pot;

a stirrer motor speed controller affixed to the outer end of said hollow shaft; and a plurality of electrical conductors passing from said stirrer motor to said stirrer motor speed controller.

7. The electrically stirred cooking pot of claim 6 wherein said electrical motor is a direct current gear motor.

8. The electrically stirred cooking pot of claim 6 wherein said stirrer motor speed controller is further supported by a second support arm.

9. The electrically stirred cooking pot of claim 6 wherein said pot includes cover securement means.

10. The electrically stirred cooking pot of claim 6 wherein said electrical motor, and said motor speed controller are separately surrounded by a protective cover, and said hollow shaft is flanged at each end, and the flange at each end is supported by the protective cover of said motor and of said speed controller.

* * * * *